Nov. 8, 1927.
F. E. PHILLIPS
1,648,820
REVERSING MECHANISM FOR MACHINE TOOLS
Filed May 5, 1926  2 Sheets-Sheet 1
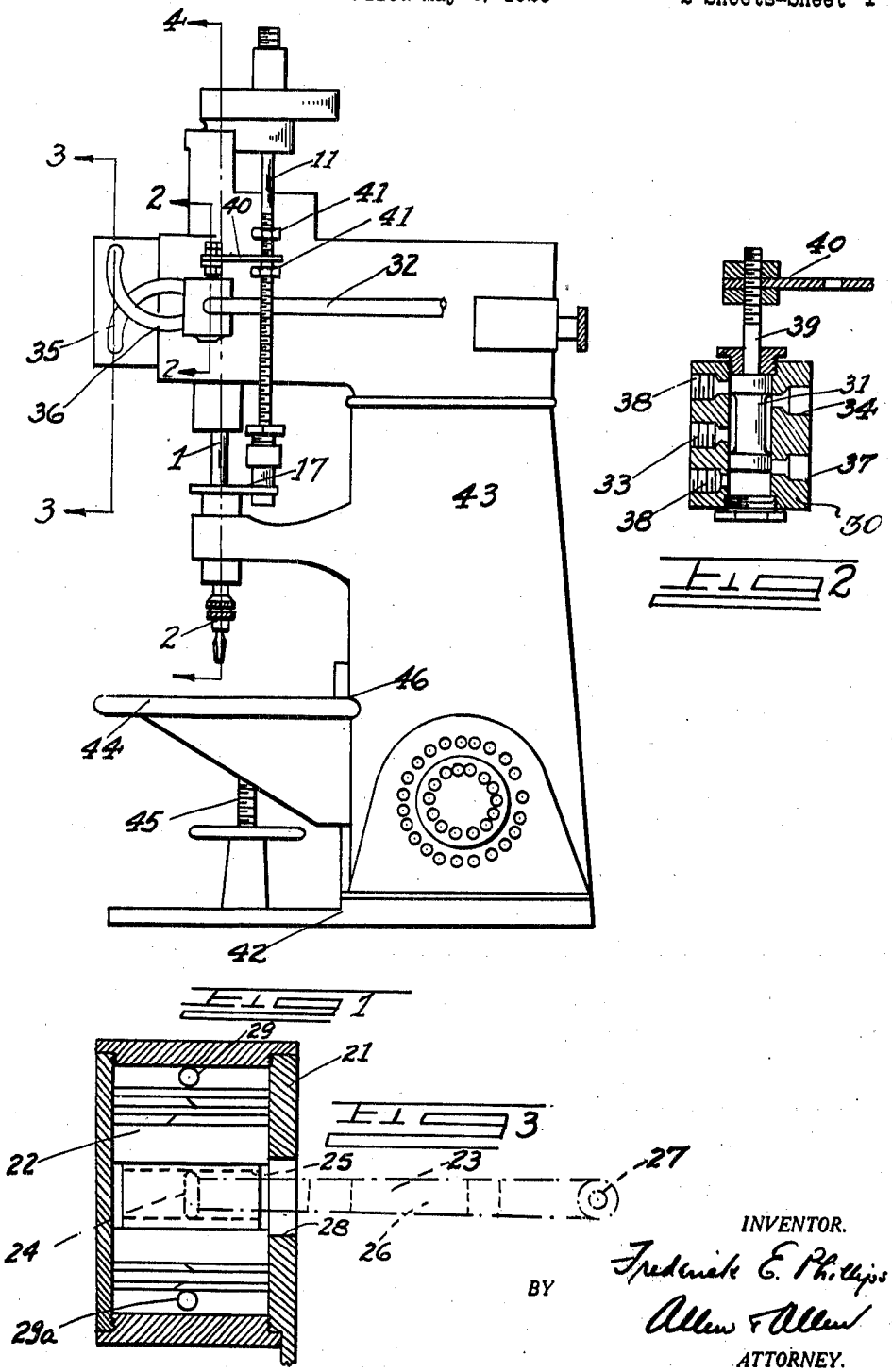
INVENTOR.
Frederick E. Phillips
BY
Allen & Allen
ATTORNEY.

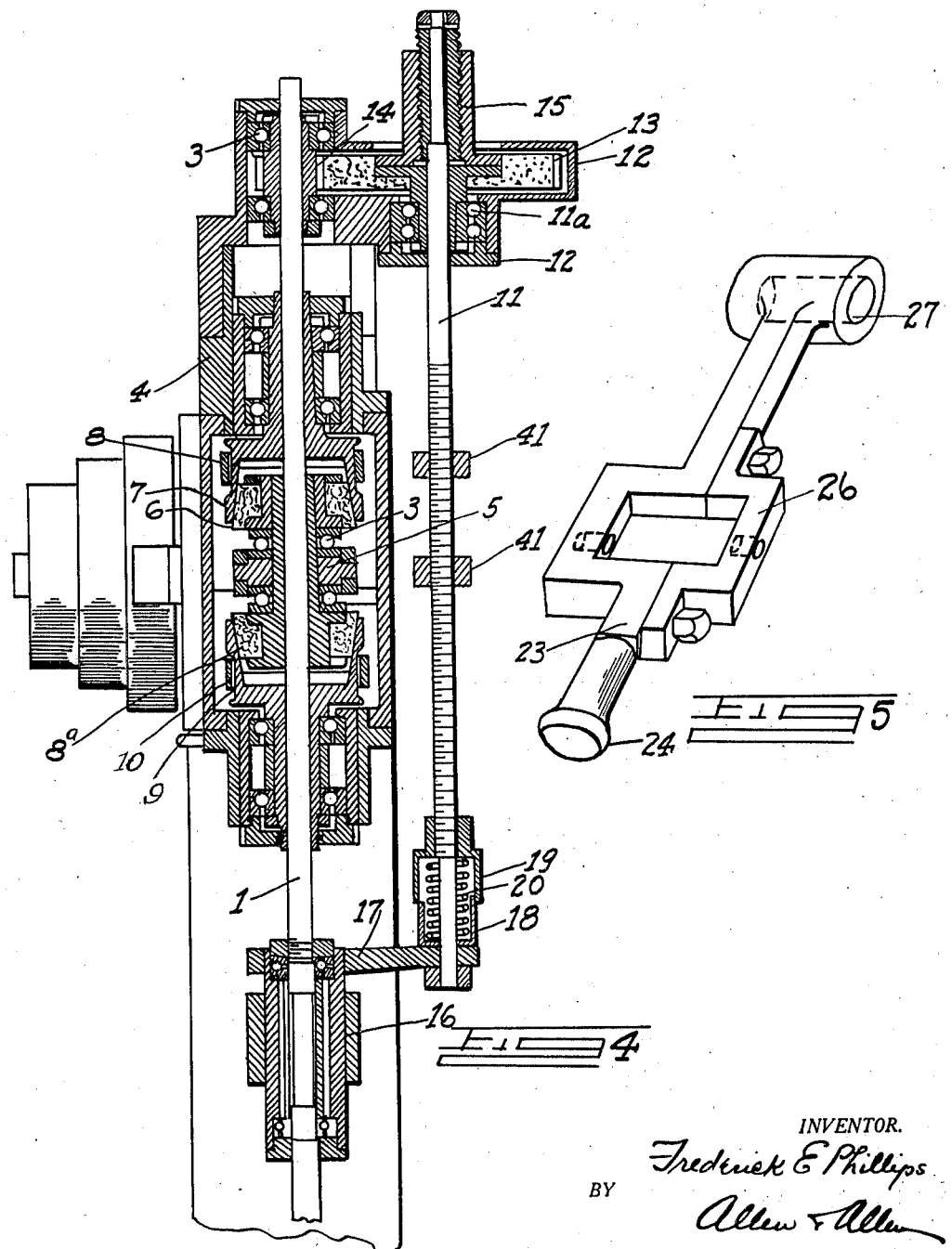

Patented Nov. 8, 1927.

1,648,820

UNITED STATES PATENT OFFICE.

FREDERICK E. PHILLIPS, OF NEWPORT, KENTUCKY, ASSIGNOR TO ALLEN & ALLEN, A FIRM COMPOSED OF ALFRED M. ALLEN AND MARSTON ALLEN, OF CINCINNATI, OHIO.

REVERSING MECHANISM FOR MACHINE TOOLS.

Application filed May 5, 1926. Serial No. 106,956.

My invention relates broadly to reversing mechanism for machine tools and particularly to pneumatic reversing mechanism for high speed machine tools.

It is the object of my invention to provide pneumatic reversing mechanism for a reversing tool such as a tapping machine. In this particular type of tool the problem for the mechanic is to set a piece of work having a series of holes drilled therein under a tap which will thread the holes one after another. In order to accomplish a maximum amount of work the problem of reversing the tools becomes of great importance. Automatic reversing devices which operate for a given stroke and then reverse have been made, but to the best of my knowledge and belief such mechanisms have been actuated either by a manual shifter or by mechanical connections with the driving mechanism. It is the object of my invention to actuate the reversing mechanism by an adjustable automatic pneumatic control valve, which in turn actuates a pneumatic piston, which is connected with an arm so as to reverse the tapping mechanism.

By the use of my novel reversing mechanism I am able to reverse a machine tool such as a tapping machine operating three or four thousand revolutions per minute as frequently as three hundred times per minute without appreciable wear or undue strain on the machine.

Referring to the drawings in which I have illustrated a preferred embodiment as applied to a tapping machine:

Figure 1 is a side elevation of the tapping machine embodying my invention.

Figure 2 is a section of the pneumatic valve taken along the lines 2—2 in Figure 1.

Figure 3 is a sectional view of the pneumatic piston for actuating the reversing mechanism taken along the lines 3—3 in Figure 1.

Figure 4 is a vertical section through the machine taken along the lines 4—4 in Figure 1.

Figure 5 is a perspective view of the shifter rod connecting the piston with the reversing clutches.

Referring first to Figure 4 the tapping machine has a central shaft 1 which carries the tap chuck 2. The shaft is provided with vertical bearings 3 within the casing 4 of the head of the machine. The rotation of the shaft is accomplished by a compound internal clutch unit 5 which has a slidable connection with the shaft but is non-rotatably mounted thereon. The clutch has an upper face 6 which, when it engages with an external clutch element 7 which is rotated in one direction by a belt 8, causes rotation of the shaft 1 in the same direction. The clutch has a lower frictional engaging face $8^a$ which, when it engages the external clutch element 9 which is rotated in the opposite direction as by the belt 10 traveling in the direction opposite to the belt 8 causes the rotation of the shaft 1 in the opposite direction. I have not detailed the connections with the driving parts of the tapping machine as they form no part of my invention and machine tools have for many years had shifting mechanism similar to that just described which depended for actuative reversing means on a shifter rod which was either mechanically or manually operated so as to raise and lower the compound clutch disc to impart rotation in either a clockwise or counterclockwise direction.

In the particular machine tool illustrated there is another vertical shaft 11 or leadscrew which is journalled in vertical bearings $11^a$ in a side head casing 12 and to which rotation is imparted by a gear 13 which meshes with a gear 14 mounted at the top end of the shaft 1. This gear 13 preferably has a slidable connection with the shaft 11, and an internally threaded screw 15 fixed in the casing, with the rotation of the gear 13, causes the shaft 11 to be vertically raised or lowered. The shaft 11 regulates the vertical position of the shaft 1 by a collar housing 16 which rotatably but not slidably engages the end of the shaft 1 near the chuck. A link 17 connects the collar housing and the end of the shaft 11. The connection between the link 17 and the shaft 11 is preferably as indicated. I have shown the link as engaging a sleeve 18 which is slidably retained within a sleeve 19 on the end of the shaft 11 with a spring 20 enclosed within the sleeve so tensioned that should the tap be lowered and miss the hole or strike it unevenly, the tap will not be broken but the resilient link connection will take up the motion necessary to permit the tap to remain in a fixed position even though the driving mechanism is advancing.

From the foregoing description of the structure of the tapping machine it will be noted that my reversing mechanism requires two controls. The first is the control of the shifting clutch which regulates the turning of the tapping tool in one direction and then the other. The second control is from the lead screw and by it the longitudinal movement of the tapping tool is regulated.

For elevating and lowering the clutch, I have provided a piston cylinder 21 within which is slidably mounted the piston head 22, which has a rocker arm 23 which has an enlarged end 24 which is horizontally slidably retained in a slot 25 in the piston. The rocker has a yoked portion 26, which engages a collar of the compound clutch disc and the end of the rocker opposite the piston is pivotally mounted by means of a shaft which extends through a hub portion 27 of the rocker. The piston cylinder 21 is also provided with a slot 28 through which the rocker extends. It will thus be apparent that as the piston 22 is raised and lowered in the cylinder, the clutch will be moved up and down and so drive the shaft 1 in either a clockwise or counterclockwise direction.

The cylinder has ports 29 and 29ª for the compression and exhaust strokes. For controlling the entry and exhaust of compressed air to the cylinder, I have provided a valve casing 30 in which a pneumatic valve 31 regulates the operation of the piston. In the structure shown, the air supply line is indicated at 32 and the inlet valve opening in the casing is in the center, so as to provide a balanced valve at 33. The drawing in Figure 2 shows the parts in the position at the beginning of a stroke. The casing has a port 34, which in the position shown is in operative connection wth the air supply line. The tubing 35 connects the port 34 with the port 29ª of the cylinder, and in the position indicated, the piston would be moved upwardly wthin the cylinder. During the upward movement of the piston, the air above the piston would be exhausted by passing through the port 29, and through the tubing 36 into the port 37. From the port 37 the exhaust air would pass through the opening below the valve and be discharged into the atmosphere through the port 38. When the valve 31 is moved to the position opposite to that illustrated the operation will be reversed.

For controlling the operation of the valve a valve stem 39 is connected with the valve. The valve stem is connected with an arm 40 which has an end which lies in the path of adjustable nuts 41 carried by the lead screw 11. The length of the stroke is determined by the distance apart of the adjustment nuts 41 and the changing of the valve is entirely automatic so that the tapping of holes with the tap is determined by the speed with which the operator can advance the work from one hole to another rather than by the speed of the machine or the speed with which the operator can shift a manual shifting device.

The tapping machine is supported on a base 42 and the gears, motor and speed change gears are preferably enclosed within a casing 43. An adjustable work plate 44 is carried by the base by means of an adjustment screw 45. The plate is slidably mounted in the casing as indicated at 46 so that a firm support for work to be tapped is thus provided.

While I have disclosed my invention specifically in combination with a tapping machine it should be understood that the principle involved is adapted for other machine tools in which a similar reversing operation is required.

The cycle of operation is as follows: The air is turned on and the mechanism for rotating the tool carrying spindle started up with the regulation of the nuts on the lead screw the length of the stroke can be determined. As soon as the lower nut raises the valve, the air is exhausted from the lower side of the pneumatic cylinder, and compressed air forces down the piston carrying the shifting lever which releases the upper cone clutch and causes the engagement of the lower cone clutch. The spindle then descends with the tapping tool until the upper nut lowers the valve and reverses the mechanism for the return strokes of the tapping tool. It will be noted that the pneumatic piston and the valve move in alignment with the spindle. By reversing the air passages, an opposite cycle could be obtained, so that notwithstanding which direction the belts 8 and 10 rotate, the proper control can be readily provided.

I have shown an independently mounted pneumatic cylinder and an independently mounted valve shifting mechanism, but it will be apparent that both elements may be incorporated in a single housing. It will further be obvious that my mechanism is adapted for use with steam or other compressed gases.

Having thus described my invention what I claim as new and desire to secure by Letters Patent is:

1. In a machine tool, a rotatable tool spindle, a pair of reversing clutch members normally loose on the spindle, means for driving the loose clutch members in opposite directions, a slidable clutch member fixed against rotation on the spindle, a pneumatic cylinder and piston adjacent the spindle, means for admitting air to opposite sides of the piston, a pivoted lever connecting the piston and the slidable clutch member, a lead screw driven by the tool spindle, and means on the lead screw for actuating the air admission means.

2. In a machine tool, a rotatable tool spindle, a pair of reversing clutch members normally loose on the spindle, means for driving the loose clutch members in opposite directions, a slidable clutch member fixed against rotation on the spindle, a pneumatic cylinder and piston adjacent the spindle, means for admitting air to opposite sides of the piston, a pivoted lever connecting the piston and the slidable clutch member, said lever loosely engaging the piston and extending through a wall of the cylinder, a lead screw driven by the tool spindle, and means on the lead screw for actuating the air admission means.

3. In a machine tool, a rotatable tool spindle, a pair of reversing clutch members normally loose on the spindle, means for driving the loose clutch members in opposite directions, a slidable clutch member fixed against rotation on the spindle, a pneumatic cylinder and piston adjacent the spindle, a pivoted lever connecting the piston and the slidable clutch member, an air valve for controlling the operation of the piston, a lead screw driven by the spindle, and means on the lead screw for actuating the air valve.

4. In a machine tool, a rotatable tool spindle, a pair of reversing clutch members normally loose on the spindle, means for driving the loose clutch members in opposite directions, a slidable clutch member fixed against rotation on the spindle, means for operating the sliding clutch member to engage alternately the loose clutch members, a lead screw geared at one end to the tool spindle and having its opposite end resiliently connected with the spindle, and means on the lead screw for actuating the sliding clutch member operating means.

5. In a machine tool, a rotatable tool spindle, a pair of driving pulleys normally loose on the spindle, means for driving the pulleys in opposite directions, opposed clutch members on the pulleys, a slidable clutch member fixed against rotation on the spindle, a pneumatic cylinder and piston adjacent the spindle, means for actuating the piston, a pivoted lever connecting the piston and the slidable clutch member, a lead screw geared to the rotatable spindle, and means connected with the lead screw for actuating the piston actuating means.

FREDERICK E. PHILLIPS.